United States Patent
Fu et al.

(10) Patent No.: US 11,657,822 B2
(45) Date of Patent: May 23, 2023

(54) SYSTEMS AND METHODS FOR PROCESSING AND PRESENTING CONVERSATIONS

(71) Applicant: Otter.ai, Inc., Los Altos, CA (US)

(72) Inventors: Yun Fu, Cupertino, CA (US); Simon Lau, San Jose, CA (US); Fuchun Peng, Cupertino, CA (US); Kaisuke Nakajima, Sunnyvale, CA (US); Julius Cheng, Cupertino, CA (US); Gelei Chen, Mountain View, CA (US); Sam Song Liang, Palo Alto, CA (US)

(73) Assignee: Otter.ai, Inc., Los Altos, CA (US)

( * ) Notice: Subject to any disclaimer, the term of this patent is extended or adjusted under 35 U.S.C. 154(b) by 0 days.

(21) Appl. No.: 17/195,202

(22) Filed: Mar. 8, 2021

(65) Prior Publication Data

US 2021/0217420 A1    Jul. 15, 2021

Related U.S. Application Data

(63) Continuation of application No. 16/027,511, filed on Jul. 5, 2018, now Pat. No. 10,978,073.

(60) Provisional application No. 62/530,227, filed on Jul. 9, 2017.

(51) Int. Cl.
| | |
|---|---|
| *G10L 17/00* | (2013.01) |
| *G10L 15/26* | (2006.01) |
| *G06F 16/34* | (2019.01) |
| *G06F 16/35* | (2019.01) |
| *G10L 15/08* | (2006.01) |
| *H04N 7/15* | (2006.01) |

(52) U.S. Cl.
CPC .............. *G10L 15/26* (2013.01); *G06F 16/34* (2019.01); *G06F 16/35* (2019.01); *G10L 15/08* (2013.01); *G10L 17/00* (2013.01); *H04N 7/15* (2013.01)

(58) Field of Classification Search
CPC ............ H04N 7/15; G10L 15/08; G10L 17/00
See application file for complete search history.

(56) References Cited

U.S. PATENT DOCUMENTS

| | | |
|---|---|---|
| 6,088,669 A | 7/2000 | Maes |
| 6,363,352 B1 | 3/2002 | Dailey et al. |
| 6,434,520 B1 | 8/2002 | Kanevsky et al. |
| 6,513,003 B1 | 1/2003 | Angell et al. |

(Continued)

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.

(Continued)

*Primary Examiner* — Feng-Tzer Tzeng
(74) *Attorney, Agent, or Firm* — Faegre Drinker Biddle & Reath LLP

(57) ABSTRACT

System and method for processing and presenting a conversation. For example, a system includes a sensor configured to capture an audio-form conversation, and a processor configured to automatically transform the audio-form conversation into a transformed conversation. The transformed conversation includes a synchronized text, and the synchronized text is synchronized with the audio-form conversation. Additionally, the system includes a presenter configured to present the transformed conversation including the synchronized text and the audio-form conversation.

20 Claims, 11 Drawing Sheets

(56) References Cited

U.S. PATENT DOCUMENTS

| | | |
|---|---|---|
| 9,571,652 B1 | 2/2017 | Zeppenfeld et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,423,911 B1 | 8/2022 | Fu et al. |
| 11,431,517 B1 | 8/2022 | Fu et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2009/0019367 A1 | 1/2009 | Cavagnari et al. |
| 2009/0210391 A1 | 8/2009 | Hall et al. |
| 2009/0307189 A1* | 12/2009 | Bobbitt ................ G06F 16/00 |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0253805 A1 | 10/2012 | Rajakumar et al. |
| 2012/0275761 A1* | 11/2012 | Li ........................... H04N 5/92 |
| | | 386/239 |
| 2012/0323575 A1 | 12/2012 | Gibbon et al. |
| 2012/0324355 A1 | 12/2012 | Mbenkum et al. |
| 2013/0300939 A1 | 11/2013 | Chou et al. |
| 2013/0311177 A1* | 11/2013 | Bastide ................ H04N 7/15 |
| | | 704/235 |
| 2013/0346077 A1 | 12/2013 | Mengibar et al. |
| 2014/0029757 A1 | 1/2014 | Aronowitz et al. |
| 2014/0136999 A1 | 5/2014 | Leibovich et al. |
| 2015/0249747 A1 | 9/2015 | Box et al. |
| 2015/0255068 A1 | 9/2015 | Kim et al. |
| 2015/0310863 A1 | 10/2015 | Chen et al. |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0070706 A1 | 3/2017 | Ursin et al. |
| 2017/0169816 A1 | 6/2017 | Blandin et al. |
| 2017/0294184 A1 | 10/2017 | Bradley |
| 2018/0007060 A1 | 1/2018 | Leblang et al. |
| 2018/0032226 A1 | 2/2018 | Ryu et al. |
| 2018/0174108 A1 | 6/2018 | Kang et al. |
| 2018/0197548 A1* | 7/2018 | Palakodety ............. G10L 17/06 |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 | 3/2021 | Ranalli et al. |
| 2021/0319797 A1 | 10/2021 | Fu et al. |
| 2021/0327454 A1 | 10/2021 | Fu et al. |
| 2021/0407520 A1 | 12/2021 | Neckermann et al. |
| 2021/0409547 A1 | 12/2021 | Channapragada et al. |

OTHER PUBLICATIONS

United States Patent and Trademark Office, Office Action dated Sep. 8, 2021, in U.S. Appl. No. 16/598,820.

United States Patent and Trademark Office, Notice of Allowance dated Mar. 10, 2022, in U.S. Appl. No. 16/598,820.

United States Patent and Trademark Office, Notice of Allowance dated Apr. 14, 2022, in U.S. Appl. No. 16/598,820.

United States Patent and Trademark Office, Office Action dated Sep. 8, 2021, in U.S. Appl. No. 16/780,630.

United States Patent and Trademark Office, Notice of Allowance dated Feb. 11, 2022, in U.S. Appl. No. 16/780,630.

United States Patent and Trademark Office, Notice of Allowance dated Apr. 15, 2022, in U.S. Appl. No. 16/780,630.

United States Patent and Trademark Office, Office Action dated Jun. 24, 2022, in U.S. Appl. No. 17/678,676.

United States Patent and Trademark Office, Office Action dated Oct. 14, 2022, in U.S. Appl. No. 17/678,676.

United States Patent and Trademark Office, Office Action dated Dec. 8, 2022, in U.S. Appl. No. 17/242,465.

United States Patent and Trademark Office, Office Action dated Dec. 7, 2022, in U.S. Appl. No. 17/863,837.

United States Patent and Trademark Office, Office Action dated Dec. 7, 2022, in U.S. Appl. No. 17/863,881.

United States Patent and Trademark Office, Office Action dated Apr. 5, 2023, in U.S. Appl. No. 17/242,465.

United States Patent and Trademark Office, Notice of Allowance dated Feb. 1, 2023, in U.S. Appl. No. 17/678,676.

* cited by examiner

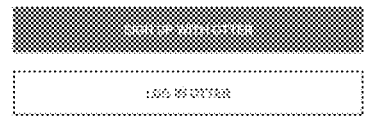
FIG.15  FIG.16  FIG.17
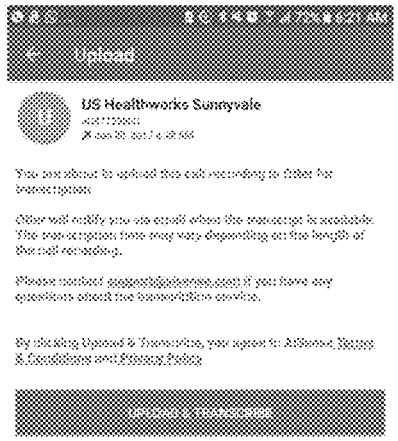
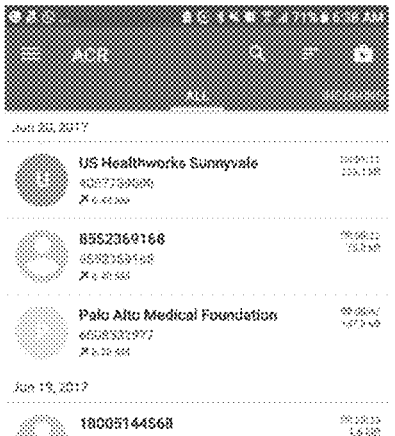
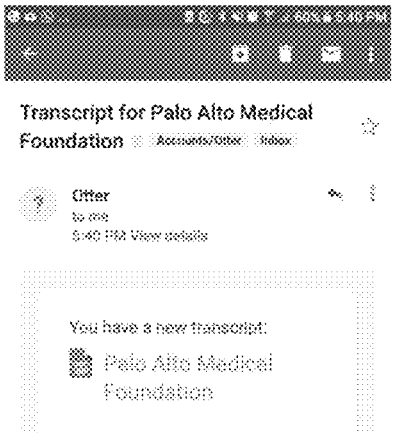
FIG.18  FIG.19  FIG.20

SYSTEMS AND METHODS FOR PROCESSING AND PRESENTING CONVERSATIONS

1. CROSS-REFERENCES TO RELATED APPLICATIONS

This application is a continuation of U.S. patent application Ser. No. 16/027,511, filed Jul. 5, 2018, which claims priority to U.S. Provisional Patent Application No. 62/530,227, filed Jul. 9, 2017, incorporated by reference herein for all purposes.

2. BACKGROUND OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

Conversations, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time.

Hence it is highly desirable to provide systems and methods for processing and presenting conversations (e.g., in an automatic manner) to increase the value of conversations, such as human-to-human conversations, at least by increasing the comprehensiveness and accuracy of information extractable from the conversations.

3. BRIEF SUMMARY OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

According to one embodiment, a system for processing and presenting a conversation includes a sensor configured to capture an audio-form conversation, and a processor configured to automatically transform the audio-form conversation into a transformed conversation. The transformed conversation includes a synchronized text, and the synchronized text is synchronized with the audio-form conversation. Additionally, the system includes a presenter configured to present the transformed conversation including the synchronized text and the audio-form conversation.

According to another embodiment, a computer-implemented method for processing and presenting a conversation includes receiving an audio-form conversation, and automatically transforming the audio-form conversation into a transformed conversation. The transformed conversation includes a synchronized text, and the synchronized text is synchronized with the audio-form conversation. Additionally, the method includes presenting the transformed conversation including the synchronized text and the audio-form conversation.

According to yet another embodiment, a non-transitory computer-readable medium with instructions stored thereon, that when executed by a processor, perform the processes including: receiving an audio-form conversation; automatically transforming the audio-form conversation into a transformed conversation, the transformed conversation including a synchronized text, the synchronized text being synchronized with the audio-form conversation; and presenting the transformed conversation including the synchronized text and the audio-form conversation.

According to yet another embodiment, a system for presenting a conversation includes: a sensor configured to capture an audio-form conversation and send the captured audio-form conversation to a processor, the processor configured to automatically transform the audio-form conversation into a transformed conversation, the transformed conversation including a synchronized text, the synchronized text being synchronized with the audio-form conversation; and a presenter configured to receive the transformed conversation from the processor and present the transformed conversation including the synchronized text and the audio-form conversation.

According to yet another embodiment, a computer-implemented method for processing and presenting a conversation includes: receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation.

According to yet another embodiment, a non-transitory computer-readable medium with instructions stored thereon, that when executed by a processor, perform the processes including: receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation.

According to yet another embodiment, a system for transforming a conversation includes a processor configured to: receive from a sensor a captured audio-form conversation; automatically transform the audio-form conversation into a transformed conversation, the transformed conversation including a synchronized text, the synchronized text being synchronized with the audio-form conversation; and send the transformed conversation to a presenter configured to present the transformed conversation including the synchronized text and the audio-form conversation.

According to yet another embodiment, a computer-implemented method for transforming a conversation includes: receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation.

According to yet another embodiment, a non-transitory computer-readable medium with instructions stored thereon, that when executed by a processor, perform the processes comprising: receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIGS. 4-22 are simplified diagrams showing a user interface and/or a presenter related to FIG. 1, FIG. 2, and/or FIG. 3 according to some embodiments of the present invention.

5. DETAILED DESCRIPTION OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

Figure 1:
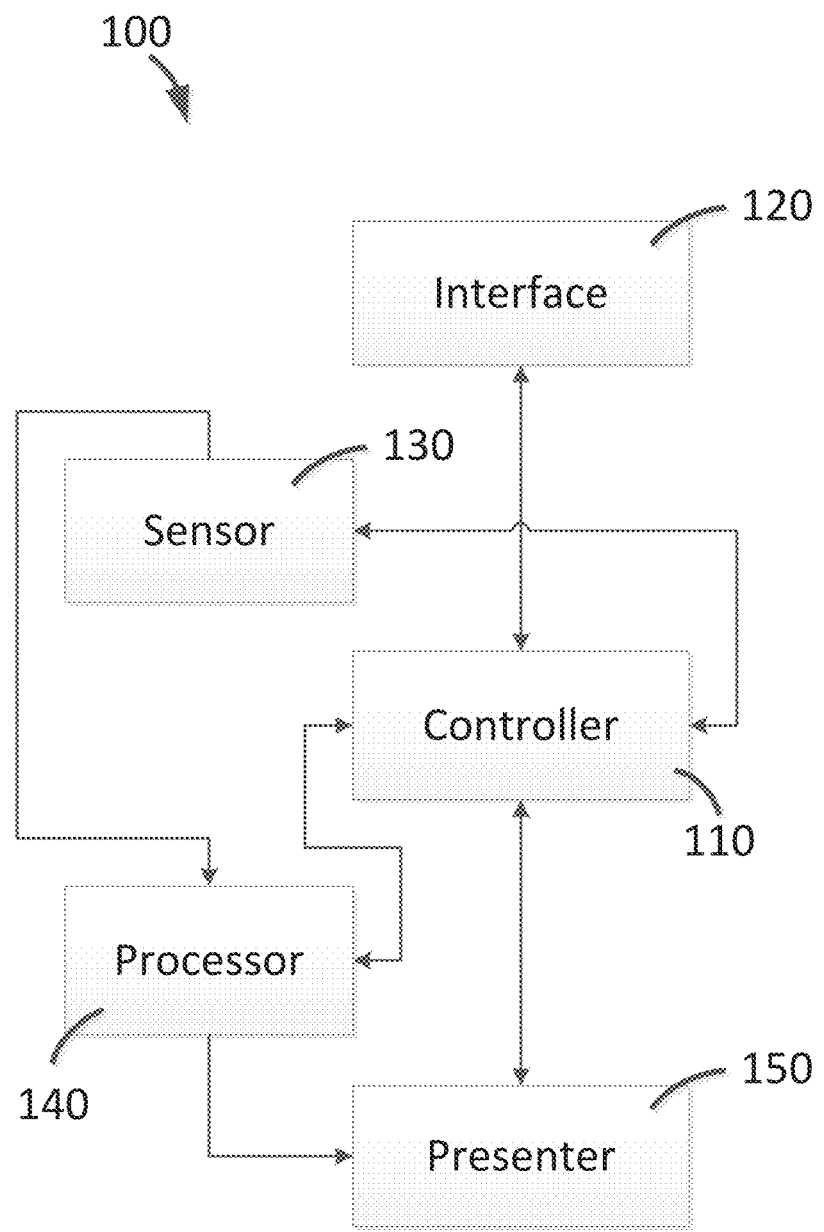
FIG. 1 is a simplified diagram showing a system for processing and presenting one or more conversations according to some embodiments of the present invention.

FIG. 1 is a simplified diagram showing a system 100 for processing and presenting one or more conversations according to some embodiments of the present invention. This diagram is merely an example, which should not unduly limit the scope of the claims. One of ordinary skill in the art would recognize many variations, alternatives, and modifications. The system 100 includes a controller 110, an interface 120, a sensor 130, a processor 140, and a presenter 150. In some examples, the presenter 150 includes a mobile device, a web browser, a computer, a watch, a phone, a tablet, a robot, a projector, a television, and/or a display. In certain examples, the presenter 150 includes part of a mobile device, part of a web browser, part of a computer, part of a watch, part of a phone, part of a tablet, part of a robot, part of a projector, part of a television, and/or part of a display. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the controller 110 is configured to receive and/or send one or more instructions to other components of the system 100. For example, the controller 110 is configured to receive a first instruction from the interface 120 and send a second instruction to the sensor 130. In some examples, the controller 110 is or is part of a computing device (e.g., a computer, a phone, a laptop, a tablet, a watch, a television, a recording device, and/or a robot). In some embodiments, the controller includes hardware (e.g., a processor, a memory, a transmitter, a receiver, and/or software) for receiving, transmitting, and/or transforming instructions.

According to some embodiments, the interface 120 includes a user interface and/or is configured to receive a user instruction from a user of the system 100, and send a system instruction to one or more other components of the system 100 (e.g., the controller 110). For example, the interface includes a touchscreen, a button, a keyboard, a dialer (e.g., with number pad), an audio receiver, a gesture receiver, an application such as Otter for IOS or Android, and/or a webpage. In another example, the user is a human or another hardware and/or software system. In some embodiments, the interface 120 is configured to receive a first start instruction (e.g., when a user taps a start-record button in a mobile application) and to send a second start instruction to the controller 110 which in turn sends a third start instruction to, for example, the sensor 130. In some embodiments, the interface 120 is controlled by the controller 110 to provide one or more selectable actions (e.g., by the user). For example, the controller 110 controls the interface 120 to display a search bar and/or a record button for receiving instructions such as user instructions. In some embodiments, the interface 120 is communicatively coupled to the controller 110 and/or structurally contained or included in a common device (e.g., phone).

In some embodiments, the sensor 130 is configured to receive an instruction and sense, receive, collect, detect, and/or capture a conversation in audio form (e.g., an audio file and/or an audio signal). For example, the sensor 130 includes an audio sensor and is configured to capture a conversation in audio form, such as to record a conversation (e.g., a human-to-human conversation). In some examples, the audio sensor is a microphone, which is included as part of a device (e.g., a mobile phone) and/or a separate component coupled to the device (e.g., the mobile phone), and the device (e.g., the mobile phone) includes one or more components of the system 10 (e.g., controller 110). In some examples, the human-to-human conversation captured by the sensor 130 is sent (e.g., transmitted) to other components of the system 100. For example, the audio-form conversation captured by the sensor 130 (e.g., the audio recorded by the sensor 130) is sent to the processor 140 of the system 10. In some embodiments, the sensor 130 is communicatively coupled to the controller such that the sensor is configured to send a status signal (e.g., a feedback signal) to the controller to indicate whether the sensor is on (e.g., recording or capturing) or off (e.g., not recording or not capturing).

According to some embodiments, the processor 140 is configured to receive input including data, signal, and/or information from other components of the system 100, and to process, transform, transcribe, extract, and/or summarize the received input (e.g., audio recording). In some examples, the processor 140 is further configured to send, transmit, and/or present the processed output (e.g., transformed conversation). For example, the processor 140 is configured to receive the captured audio-form conversation (e.g., the audio recorded by the sensor 130) from the sensor 130. As an example, the processor 140 is configured to receive the conversation in audio form (e.g., an audio file and/or an audio signal) from the sensor 130. In some examples, the processor 140 is configured to be controlled by the controller 110, such as to process the data, signal, and/or information transmitted by the sensor 130, when an instruction sent from the controller 110 is received by the processor 140. In some embodiments, the processor 140 includes an automated speech recognition system (ASR) that is configured to automatically transform and/or transcribe a conversation (e.g., a captured conversation sent from the sensor 130), such as transforming the conversation from audio recording to synchronized transcription.

In some embodiments, the processor 140 is communicatively coupled to the controller 110 such that the processor 140 is configured to send a status signal (e.g., a feedback signal) to the controller 110 to indicate whether the processor 140 is processing or idling and/or indicate a progress of a processing job. In some examples, the processor 140 includes an on-board processor of a client device such as a mobile phone, a tablet, a watch, a wearable, a computer, a television, and/or a robot. In some examples, the processor 140 includes an external processor of a server device and/or an external processor of another client device, such that the capturing (e.g., by the sensor 130) and the processing (e.g., by the processor 140) of the system 100 are performed with more than one device. For example, a sensor 130 is a microphone on a mobile phone (e.g., located at a client position) and is configured to capture a phone conversation in audio form, which is transmitted (e.g., wirelessly) to a server computer (e.g., located at a server position). For example, the server computer (e.g., located at a server position) includes the processor 140 configured to process the input (e.g., an audio file and/or an audio signal) that is sent by the sensor 130 and received by the processor 140.

According to some embodiments, the processor 140 is configured to output processed data, signal, and/or information, to the presenter 150 (e.g., a display) of the system 100. In some examples, the output is a processed or transformed form of the input received by the processor 140 (e.g., an audio file and/or an audio signal sent by the sensor 130). For example, the processor 140 is configured to generate a transformed conversation and send the transformed conversation to the presenter 150 (e.g., a display) of the system 100. As an example, the processor 140 is configured to output synchronized text accompanied by a timestamped audio recording by transforming the conversation that is captured in audio form (e.g., captured by the sensor 130). In some embodiments, the processing and/or transforming performed by the processor 140 is real-time or near real-time. In some embodiments, the processor 140 is configured to process a live recording (e.g., a live recording of a human-to-human conversation) and/or a pre-recording (e.g., a pre-recording of a human-to-human conversation).

In some embodiments, the presenter 150 is configured to present, display, play, project, and/or recreate the conversation that is captured, for example, by the sensor 130, before and/or after transformation by the processor 140. For example, the presenter 150 (e.g., a display) is configured to receive the transformed conversation from the processor 140 and present the transformed conversation. As an example, the presenter 150 (e.g., a display) receives the captured conversation from the processor 140 before and/or after input (e.g., an audio file and/or an audio signal) to the processor 140 is transformed by the processor 140 into output (e.g., transformed conversation).

In some examples, the presenter 150 is or is part of a mobile device, a web browser, a computer, a watch, a phone, a tablet, a robot, a projector, a television, and/or a display. In some embodiments, the presenter 150 is provided similarly to the interface 120 by the same device. In some examples, a mobile phone is configured to provide both the interface 120 (e.g., touchscreen) and the presenter 150 (e.g., display). In certain examples, the interface 120 (e.g., touchscreen) of the mobile phone is configured to also function as the presenter 150 (e.g., display).

In certain embodiments, the presenter 150 includes a presenter interface configured for a user, analyzer, and/or recipient to interact with, edit, and/or manipulate the presented conversation. In some examples, the presenter 150 is communicatively coupled to the controller 110 such that the controller 110 provides instructions to the presenter 150, such as to switch the presenter 150 on (e.g., presenting a transformed conversation) and/or switch the presenter 150 off.

As discussed above and further emphasized here, FIG. 1 is merely an example, which should not unduly limit the scope of the claims. One of ordinary skill in the art would recognize many variations, alternatives, and modifications. In certain examples, the system 100 further includes other components and/or features in addition to the controller 110, the interface 120, the sensor 130, the processor 140, and/or the presenter 150. For example, the system 100 includes one or more sensors additional to sensor 130, such as a camera, an accelerometer, a temperature sensor, a proximity sensor, a barometer, a biometrics, a gyroscope, a magnetometer, a light sensor, and/or a positioning system (e.g. a GPS).

Figure 2:
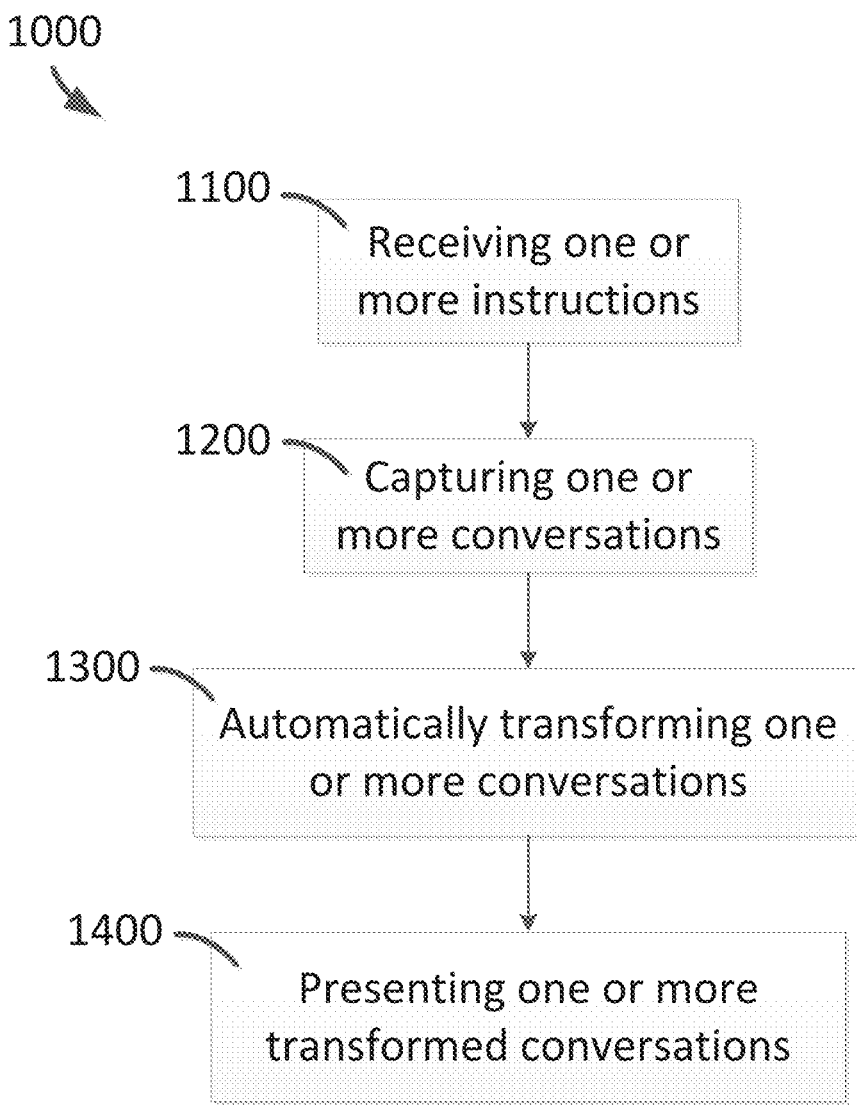
FIG. 2 is a simplified diagram showing a method for processing and presenting one or more conversations according to some embodiments of the present invention.

FIG. 2 is a simplified diagram showing a method 1000 for processing and presenting one or more conversations according to some embodiments of the present invention. This diagram is merely an example, which should not unduly limit the scope of the claims. One of ordinary skill in the art would recognize many variations, alternatives, and modifications. The method 1000 includes process 1100 for receiving one or more instructions, process 1200 for capturing one or more conversations, process 1300 for automatically transforming one or more conversations, and process 1400 for presenting one or more transformed conversations. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the method 1000 are performed by the system 100. In certain examples, some or all processes (e.g., steps) of the method 1000 are performed by a computer and/or a processor directed by a code. For example, a computer includes a server computer and/or a client computer (e.g., a smartphone). In some examples, some or all processes (e.g., steps) of the method 1000 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 1100, one or more instructions are received. In some examples, one or more instructions are provided by a user (e.g., a human, and/or a hardware and/or software system) and received by one or more components of the system 100 described above, such as received by the interface 120, the controller 110, the sensor 130, the processor 140, and/or the presenter 150. For example, the one or more instructions include a direct instruction (e.g., when the instruction is provided directly to a component) and/or an indirect instruction (e.g., when the instruction is provided to a gateway component which then instructs the component of interest to perform a process).

In certain examples, the one or more instructions cause the controller 110 to switch the sensor 130 between a capturing state and an idling state. For example, in the capturing state, the sensor 130 captures one or more conversations. In another example, in the idling state, the sensor 130 does not capture any conversation. In some examples, receiving a direct instruction includes a user directly switching on the sensor 130 to start the capturing of a conversation. In certain examples, receiving an indirect instruction includes receiving a start instruction via the interface 120, which then instructs the controller 110 to instruct the sensor 120 to start capturing a conversation.

At the process 1200, one or more conversations (e.g., one or more human-to-human conversations) are captured. In some examples, one or more conversations (e.g., a meeting conversation and/or a phone conversation) are captured by live recording via the sensor 130 (e.g., a microphone, a phone, a receiver, and/or a computing device). In certain examples, one or more conversations are captured by loading (e.g., by wire and/or wirelessly) one or more conversations in audio form (e.g., a .mp3 file, a .wav file, and/or a .m4a file). In some embodiments, capturing one or more conversations include capturing an incoming and/or outgoing phone conversation. In some embodiments, capturing one or more conversations includes capturing minutes, notes, ideas, and/or action items (e.g., of a meeting). In some embodiments, capturing one or more conversations includes capturing metadata corresponding to the one or more conversations, and the metadata include date of capture, time of capture, duration of capture, and/or title of the capture (e.g., a title that is entered via the interface 120).

In some embodiments, capturing one or more conversations includes utilizing one or more components (e.g., the sensor 130, the controller 110, the processor 140, and/or the interface 120) of the system 100 and/or utilizing one or more components external to the system 100. In some examples, the sensor 130 of the system 100 is configured to capture a live conversation. In certain examples, the controller 110 and/or the processor 140 are configured to receive a pre-recorded conversation (e.g., a .mp3 file, a .wav file, and/or a .m4a file). In some examples, the interface 120 is configured to capture metadata associated to the conversation. In certain examples, a clock (e.g., of the system 100 or external to the system 100) is configured to provide date and time information associated to the conversation.

At the process 1300, one or more conversations (e.g., the one or more conversations captured at the process 1200) are transformed (e.g., transcribed, extracted, converted, summarized, and/or processed) automatically. In some examples, the captured conversations are transformed by the processor 140. In certain examples, the process 1300 is implemented according to FIG. 3.

Figure 3:
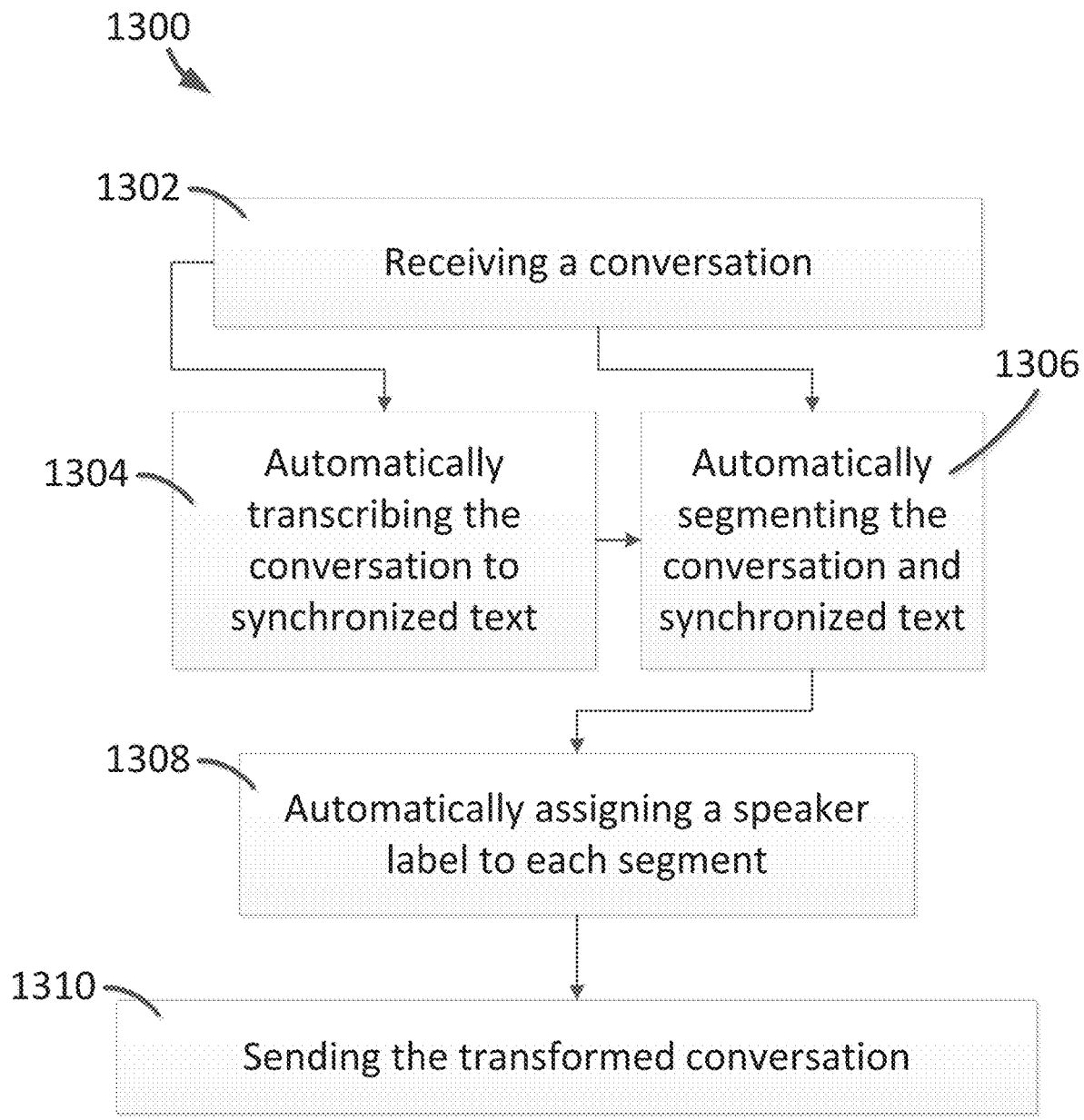
FIG. 3 is a simplified diagram showing a process for automatically transforming one or more conversations as shown in FIG. 2 according to some embodiments of the present invention.

FIG. 3 is a simplified diagram showing the process 1300 for automatically transforming one or more conversations, according to some embodiments of the present invention. This diagram is merely an example, which should not unduly limit the scope of the claims. One of ordinary skill in the art would recognize many variations, alternatives, and modifications. The process 1300 includes process 1302 for receiving a conversation, process 1304 for automatically transcribing the conversation to synchronized text (e.g., synchronized transcript), process 1306 for automatically segmenting the conversation in audio form and the synchronized text, process 1308 for automatically assigning a speaker label to each conversation segment, and process 1310 for sending the transformed conversation (e.g., including synchronized text with speaker-labeled conversation segments). Although the above has been shown using a selected group of processes for the process 1300, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the process 1300 are performed by the system 100. In certain examples, some or all processes (e.g., steps) of the process 1300 are performed by a computer and/or a processor directed by a code. For example, a computer includes a server computer and/or a client computer (e.g., a smartphone). In some examples, some or all processes (e.g., steps) of the process 1300 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 1302, a conversation (e.g., a human-to-human conversation) is received. For example, a conversation is received by the system 100, such as by the processor 140. In some embodiments, the conversation (e.g., a human-to-human conversation) received in process 1302 is in audio form (e.g., sound wave and/or digital signal) and is captured by and/or sent from the sensor 130 of the system 100. In some embodiments, the conversation received in process 1302 is a live recording (e.g., a live recording of a human-to-human conversation). In some examples, the conversation is received (e.g., by the processor 140 of the system 100) continuously and/or intermittently (e.g., via fixed frequency push). In certain examples, the conversation is received (e.g., by the processor 140 of the system 100) in real-time and/or in near real-time (e.g., with a time delay less than 5 minutes, 1 minutes, or 4 seconds between capture and reception of a conversation).

In certain embodiments, the conversation (e.g., a human-to-human conversation) received in process 1302 is a pre-recorded conversation in audio form (e.g., sound wave and/or digital signal). For example, the pre-recorded conversation is an audio recording (e.g., a .mp3 file, a .wav file, and/or a .m4a file) uploaded from an internal device and/or an external device (e.g., a local storage device such as a hard drive, and/or a remote storage device such as cloud storage). In some examples, the conversation received in process 1302 is a phone conversation. In certain examples, the conversation is automatically received in process 1302, such as by the processor 140, such as whenever a conversation is sent to the processor (e.g., from the sensor 130 and/or from the controller 110).

At the process 1304, a conversation (e.g., an audio-form conversation received at process 1302) is automatically transcribed into synchronized text. In some embodiments, the conversation is automatically transcribed (e.g., with no user input or with minimal user input). In some examples, the transcribing is performed by at least the processor 140 of the system 100. In certain examples, the transcribing is performed by the processor 140 and also modified by a human. In some embodiments, the conversation transcribed at process 1304 includes the conversation received at process 1302, which is in audio form (e.g., sound wave and/or digital signal).

Figure 11:
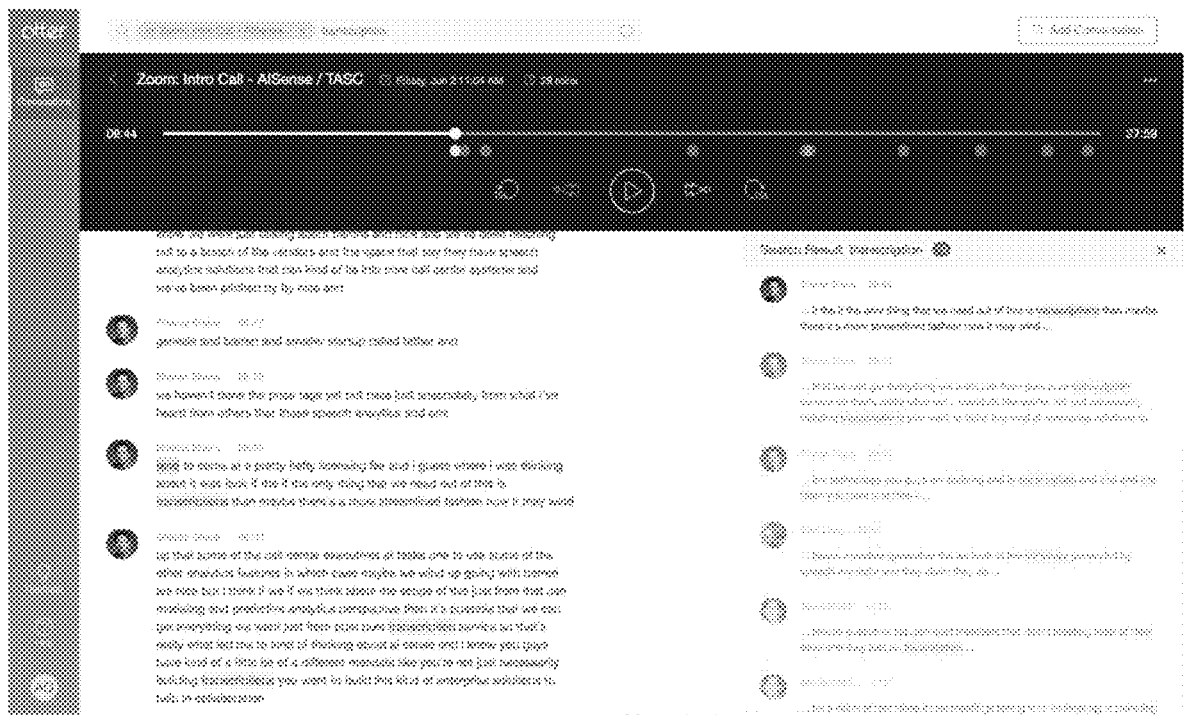

In some embodiments, the text (e.g., the transcript) generated at process 1304 includes English words, phrases, and/or terms. In certain embodiments, the audio-form conversation received at process 1302 and the text generated at process 1304 are timestamped and/or indexed with time, to synchronize the audio and the text. For example, the audio-form conversation received at process 1302 and the text (e.g., the transcript) generated at process 1304 are synchronized. In some examples, the text (e.g., the transcript) generated at process 1304 is searchable. For example, the text (e.g., the transcript) is searchable via a search bar as shown in FIG. 11, which is discussed below. In certain examples, once transcribed at process 1304, the conversation (e.g., from process 1302) becomes a transcribed conversation including both audio and text that is synchronized with the audio.

At the process 1306, a conversation in audio form (e.g., the conversation in audio form received at process 1302) and a synchronized text (e.g., the synchronized text generated at process 1304) are automatically segmented. In some embodiments, the audio-form conversation and the synchronized text are automatically segmented (e.g., with no user input or with minimal user input), and the segmented audio-form conversation and the segmented synchronized text are automatically generated. In some examples, the segmenting is performed by the processor 140 of the system 100. In certain examples, the segmenting is performed by the processor 140 and also modified by a human. In certain embodiments, the conversation (e.g., audio-form conversation and/or the synchronized text) is segmented at process 1304 into different segments when a speaker change occurs and/or a natural pause occurs. In some embodiments, each segment of the audio-form conversation and the synchronized text generated at process 1306 is associated with one or more timestamps, each timestamp corresponding to the start time, and/or the end time. In certain embodiments, each segment of the audio-form conversation and the synchronized text generated at process 1306 is associated with a segment timestamp, the segment timestamp indicating the start time, the segment duration, and/or the end time.

Figure 8:
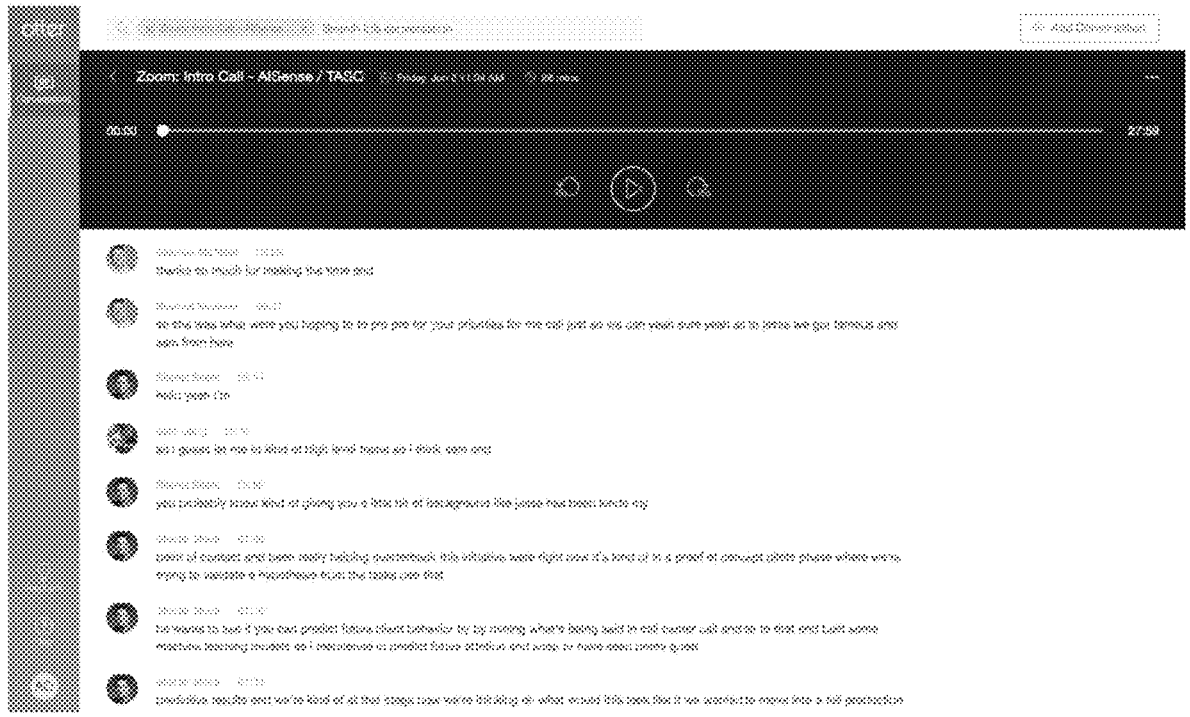

In some embodiments, the audio-form conversation and the synchronized text are segmented at process 1306 into a plurality of segments that include one or more segments corresponding to the same speaker. In some examples, each segment is spoken by a single speaker. For example, the processor 140 is configured to automatically distinguish one or more speakers of the audio-form conversation. In certain examples, multiple segments spoken by the same speaker are next to each other and/or are separated by one or more segments spoken by one or more other speakers. In some embodiments, FIG. 8 shows an audio-form conversation and its synchronized text in segmented form, and is discussed below.

In certain embodiments, once segmented at process 1306, the audio-form conversation (e.g., the conversation in audio form received at process 1302) and the synchronized text (e.g., the synchronized text generated at process 1304) becomes a segmented audio-form conversation and a segmented synchronized text. In some embodiments, segments of the audio-form conversation and segments of the synchronized text have one-to-one correspondence relationship. In some examples, each segment of audio-form conversation corresponds to one segment of synchronized text, and the segment of synchronized text is synchronized with that segment of audio-form conversation. In certain examples, different segments of audio-form conversation correspond to different segments of synchronized text, and the different segments of synchronized text is synchronized with the different segments of audio-form conversation respectively.

Figure 14:

At the process 1308, a speaker label is automatically assigned to each segment of text synchronized to one segment of audio-form conversation as generated by the process 1306. In some embodiments, the speaker label is automatically assigned (e.g., with no user input or minimal user input), and the speaker-assigned segmented synchronized text and corresponding segmented audio-form conversation are automatically generated. In some examples, the assigning of speaker label is performed by the processor 140 of the system 100. In certain examples, the assigning of speaker label is performed by the processor 140 and also modified by a human. In some embodiments, the speaker label includes a speaker name and/or a speaker picture, as shown in FIG. 14, which is discussed below.

In some embodiments, at the process 1308, one or more segments of text, which are synchronized to one or more corresponding segments of audio-form conversation, are grouped into one or more segment sets each associated with the same speaker pending a speaker label assignment. In those embodiments, the speaker label is assigned to each segment set, which in turn assign the speaker label to all segments belonging to the segment set.

In some embodiments, at the process 1308, the speaker label is assigned to each segment of text synchronized to one corresponding segment of audio-form conversation, by matching a voiceprint of the corresponding segment of audio-form conversation to a reference voiceprint corresponding to a speaker label.

Figure 22:
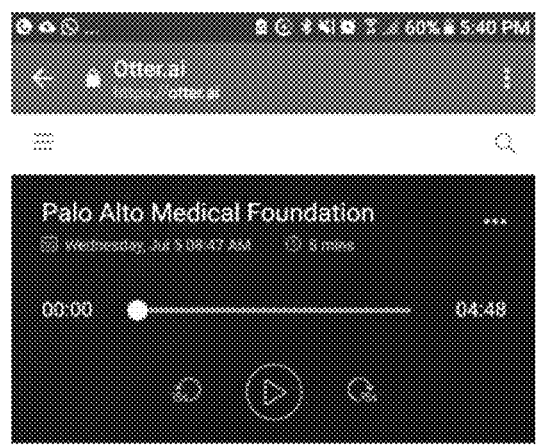

In certain embodiments, the process 1308 includes assigning an "unknown" speaker label (e.g., with no name and/or with a placeholder picture) to a segment, as shown in FIG. 22, which is discussed below. In some embodiments, once assigned with one or more speaker labels at process 1308, the segmented text that is synchronized with the segmented audio-form conversation (e.g., as generated at process 1306) becomes a speaker-assigned segmented text that is synchronized with the segmented audio-form conversation, with a speaker label assigned to each segment.

In some embodiments, a speaker corresponds to a speaker label, but a speaker label may or may not include a speaker name. In some examples, the speaker label corresponding to an unknown speaker does not include a speaker name. In certain examples, the process 1300 automatically identifies a new speaker voice print, but the user has not provided the name and/or the picture of the speaker yet; hence the speaker is determined to be, for example, an unknown speaker.

At the process 1310, a transformed conversation (e.g., including the speaker-assigned segmented synchronized text and its corresponding segmented audio-form conversation) is sent. For example, the transformed conversation is sent from the processor 140 to the controller 110 and/or to the presenter 150. In some embodiments, the transformed conversation sent at process 1310 includes the speaker-assigned segmented synchronized text and its corresponding segmented audio-form conversation as generated by the process 1308. In certain embodiments, the transformed conversation sent at process 1310 includes the segmented audio-form conversation and the segmented synchronized text as generated by the process 1306.

In some embodiments, the transformed conversation includes segmented audio, segmented text synchronized with segmented audio, speaker labels (e.g., name and/or picture) associated with the segments, and/or metadata (e.g., including a date, a time, a duration and/or a title). In certain embodiments, the transformed conversation is sent automatically, for example, by the processor 140. In certain embodiments, the transformed conversation is further sent or shared with other users, for example, via email, as shown in FIG. 19 which is discussed below.

As discussed above and further emphasized here. FIG. 3 is merely an example, which should not unduly limit the scope of the claims. One of ordinary skill in the art would recognize many variations, alternatives, and modifications. In some examples, the process 1304 and the process 1306 are modified such that segmenting the conversation in audio form occurs before synchronized text is transcribed for each segment. In certain examples, the process 1308, at which one or more speaker labels are assigned, occurs before transcribing the conversation in audio form and/or segmenting the conversation in audio form.

In certain embodiments, transcribing, segmenting, and/or assigning speaker label to a conversation are performed with the aid of a user and/or human. For example, a transcript automatically generated (e.g., at process 1304) is editable (e.g., by a user and/or human). In yet another example, segments automatically generated (e.g., at process 1306) is editable to split one segment and/or combine multiple segments (e.g., by a user and/or human). In yet another example, speaker labels automatically assigned (e.g., at process 1308) are editable (e.g., by a user and/or human).

In certain embodiments, the conversation to which transcribing, segmenting, and/or assigning speaker label are performed includes the conversation in audio form or the transcription. In some examples, the conversation in audio form is first segmented and/or speaker-assigned, and followed by having each segment transcribed to generate the synchronized text associated with each segment of conversation in audio form. In certain examples, the conversation in audio form is first transcribed to generate synchronized transcript, and followed by segmenting and/or assigning speaker label to the transcript. For example, the conversation in audio form is not directly segmented, but instead is indirectly segmented or remains unsegmented and merely corresponds to the transcript in a word-by-word relationship (e.g., each transcribed text corresponds to a timestamp with an associated audio).

Returning to FIG. 2, at process 1400, one or more transformed conversations (e.g., the transformed conversation sent at the process 1310) are presented. In certain embodiments, the process 1400 includes presenting the transformed conversation (e.g., including the speaker-assigned segmented synchronized text and its corresponding segmented audio-form conversation) with the presenter 150. In some examples, when the audio-form conversation is played, the corresponding word in the synchronized text is highlighted when the word is spoken. In certain examples, the text is synchronized with the audio-form conversation at both the segment level and the word level. In some embodiments, the process 1400 is implemented according to FIG. 7, FIG. 8, FIG. 10, and/or FIG. 11.

Figure 7:
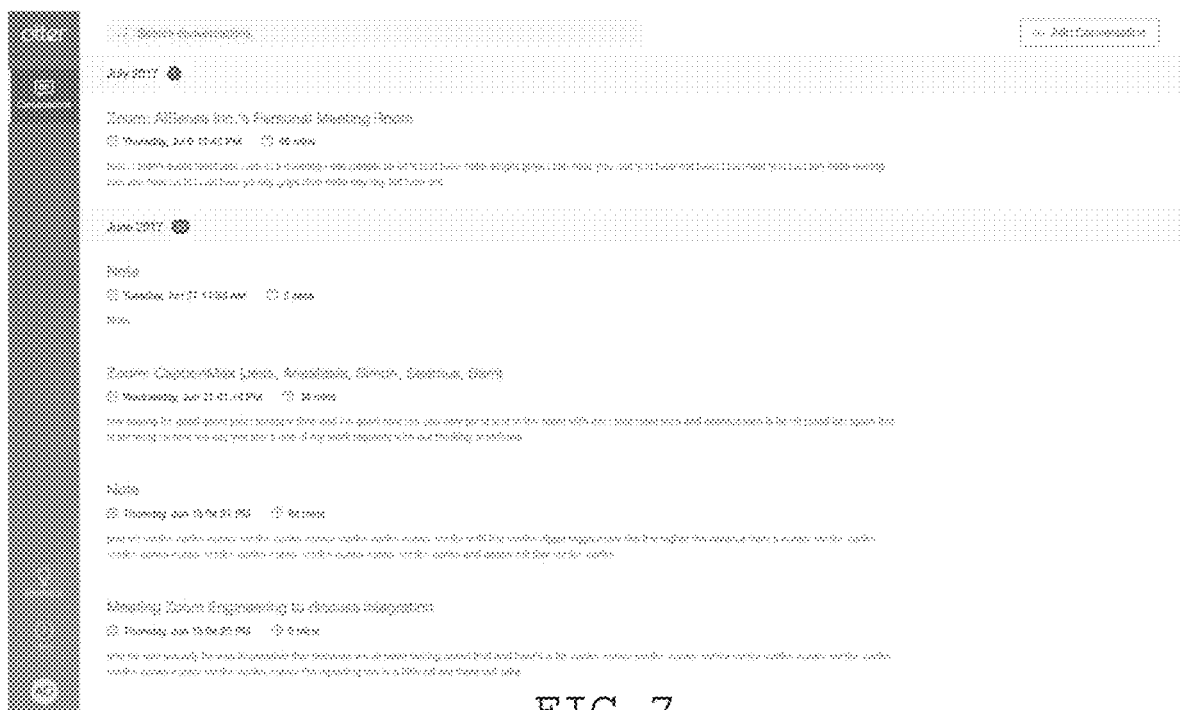

In certain embodiments, the process 1400 includes presenting the metadata associated with the transformed conversation. For example, the metadata include a date (e.g., of capturing, processing, or presenting), a time (e.g., of capturing, processing, or presenting), a duration (e.g., of the conversation), and/or a title, as shown in FIG. 7 and/or FIG. 10, each of which is discussed below. In some embodiments, the process 1400 includes presenting a player, such as an audio player. For example, the audio player is a navigable audio player (e.g., one shown in FIG. 8 and/or FIG. 11) configured to provide control (e.g., to a user) such that the presenting of the transformed conversation is interactive.

In some embodiments, the process 1400 includes presenting the speaker-assigned segmented synchronized text (e.g., generated by the process 1308) in a searchable manner, such as via a search bar. In some embodiments, the process 1400 includes presenting search results that match a searched text (e.g., via the search bar) in the speaker-assigned segmented synchronized text in a first marked form, such as a first highlighted form (e.g., highlighted in saturated and/or faded yellow).

In certain embodiments, at the process 1400, the transformed conversation is presented such that the search results (e.g., in the speaker-assigned segmented synchronized text) and/or the audio corresponding to the search results (e.g., indexed with the same timestamp) are highlighted, such as in a first marked form, as shown in FIG. 11. In some embodiments, the text being presented (e.g., matching the audio during a playback or when paused) is highlighted, such as in a second marked form, (e.g., highlighted in green). For example, the text being presented (e.g., the text being played back) is indexed with the same timestamp as the audio instance within the conversation, such as at a particular time indicated by a progress indicator along a progress bar, as shown in FIG. 11.

As discussed above and further emphasized here, FIG. 1, FIG. 2, and FIG. 3 are merely examples, which should not unduly limit the scope of the claims. One of ordinary skill in the art would recognize many variations, alternatives, and modifications. In some examples, the system as shown in FIG. 1 is used to process and present a speech by a single-speaker and/or a conversation made by a single speaker talking to himself or herself. In certain examples, the method as shown in FIG. 1 is used to process and present a speech by a single-speaker and/or a conversation made by a single speaker talking to himself or herself. In some examples, the process 1300 as shown in FIG. 3 is used to automatically transform a speech by a single-speaker and/or a conversation made by a single speaker talking to himself or herself.

FIGS. 4-22 are simplified diagrams showing a user interface and/or a presenter related to FIG. 1, FIG. 2, and/or FIG. 3 according to some embodiments of the present invention. These diagrams are merely examples, which should not unduly limit the scope of the claims. One of ordinary skill in the art would recognize many variations, alternatives, and modifications.

As shown in FIGS. 4-22, in some examples, the user interface (e.g., the user interface 120) also functions as the presenter (e.g., the presenter 150). In certain examples, one or more of FIGS. 4-22 pertain to an user interface for a web browser, and/or pertain to an user interface for an offline application for a stationary device (e.g., desktop computer, television, display) and/or a portable and/or mobile device (e.g., laptop, display, tablet, mobile phone, and/or vehicles).

Figure 4:
Figure 4:
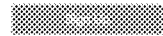
Figure 4:
Figure 4:
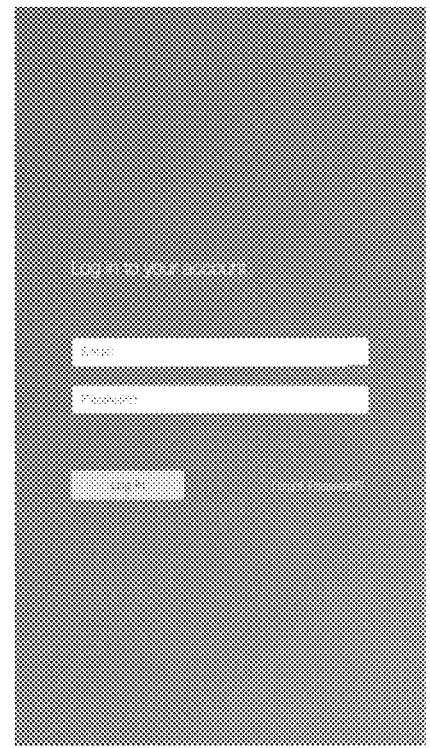
Figure 5:
Figure 5:
Figure 5:
Figure 5:
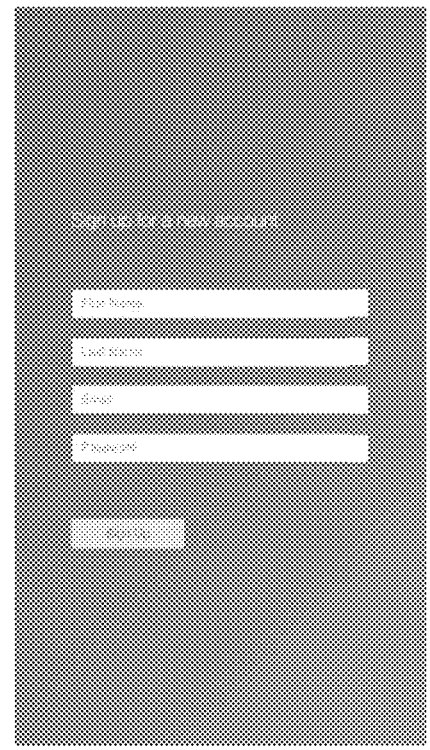
Figure 6:
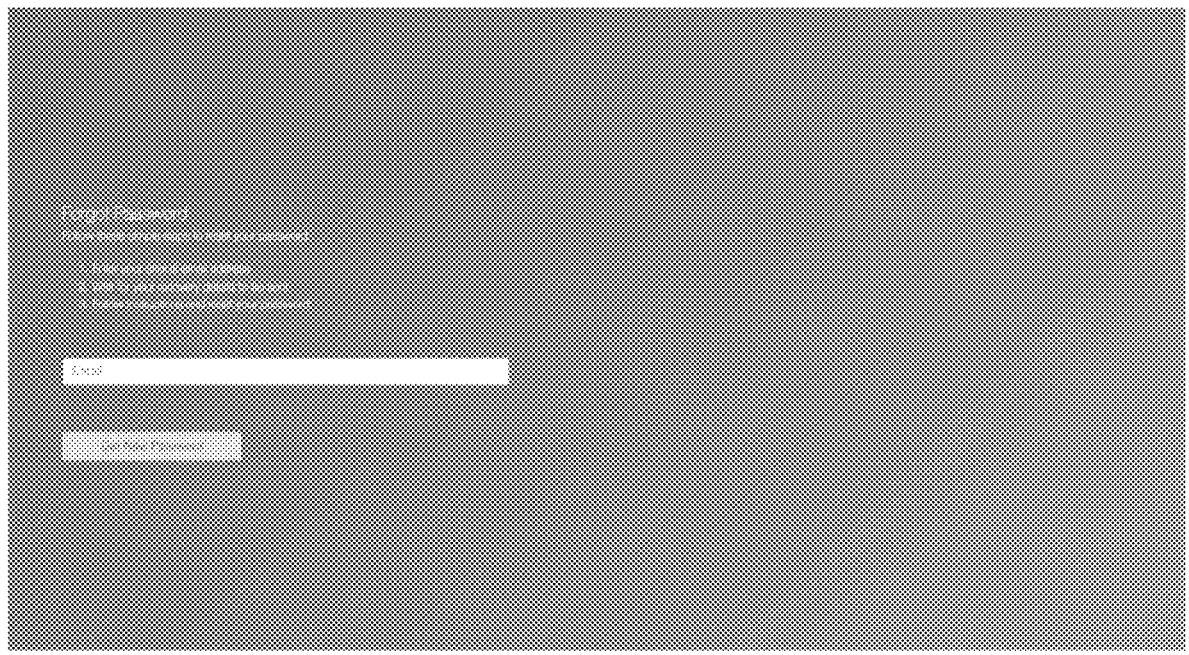

FIG. 4 shows a login page in accordance to some embodiments. FIG. 5 shows a sign up page in accordance to certain embodiments. FIG. 6 shows a forgot password page in accordance to some embodiments.

FIG. 7 shows a dashboard displaying a plurality of conversations captured and/or processed and/or ready to be presented accompanied by metadata for each conversation, according to certain embodiments. In some examples, the metadata for each conversation as shown in FIG. 7 include date and time of capturing the conversation, duration of the conversation captured, title of the captured conversation, an abstract of the conversation in text form (e.g., an abstract of the speaker-assigned segmented synchronized text as generated by the process 1308), and/or a brief extraction of the conversation in text form (e.g., a brief extraction of the speaker-assigned segmented synchronized text as generated by the process 1308). In certain examples, the user interface as shown in FIG. 7 includes a search bar configured for searching (e.g., one or more keywords) within the content and/or the metadata of the conversations. In some examples, the user interface as shown in FIG. 7 includes a link for adding (e.g., uploading) one or more conversations.

FIG. 8 shows a conversation page presenting a transformed conversation according to some embodiments. In some examples, the transformed conversation displayed in FIG. 8 includes a synchronized text in segmented form in which each segment is accompanied with a speaker label (e.g., name and/or picture), such as the speaker-assigned segmented synchronized text as generated by the process 1308. In certain examples, each segment of the transformed conversation displayed in FIG. 8 also includes a segment timestamp indicating the start of the segment and/or the end of the segment.

In some examples, the conversation page as shown in FIG. 8 displays a player (e.g., audio player) for presenting the conversation in audio form and/or in video form (e.g., segmented audio-form conversation). In certain examples, the conversation page as shown in FIG. 8 displays metadata associated with the transformed conversation including the title, the date and time of capture, and the duration of conversation captured.

In some examples, the conversation page as shown in FIG. 8 provides a control scheme configured to be controlled (e.g., by a user) to forward (e.g., by 15 s), rewind (e.g., by 15 s), play, pause, and/or jump (e.g., by moving a progress indicator along a progress bar) to certain timestamp of the transformed conversation. In certain examples, the conversation page as shown in FIG. 8 provides a search bar configured for searching (e.g., one or more keywords) within the content and/or the metadata of the presented conversation.

Figure 9:
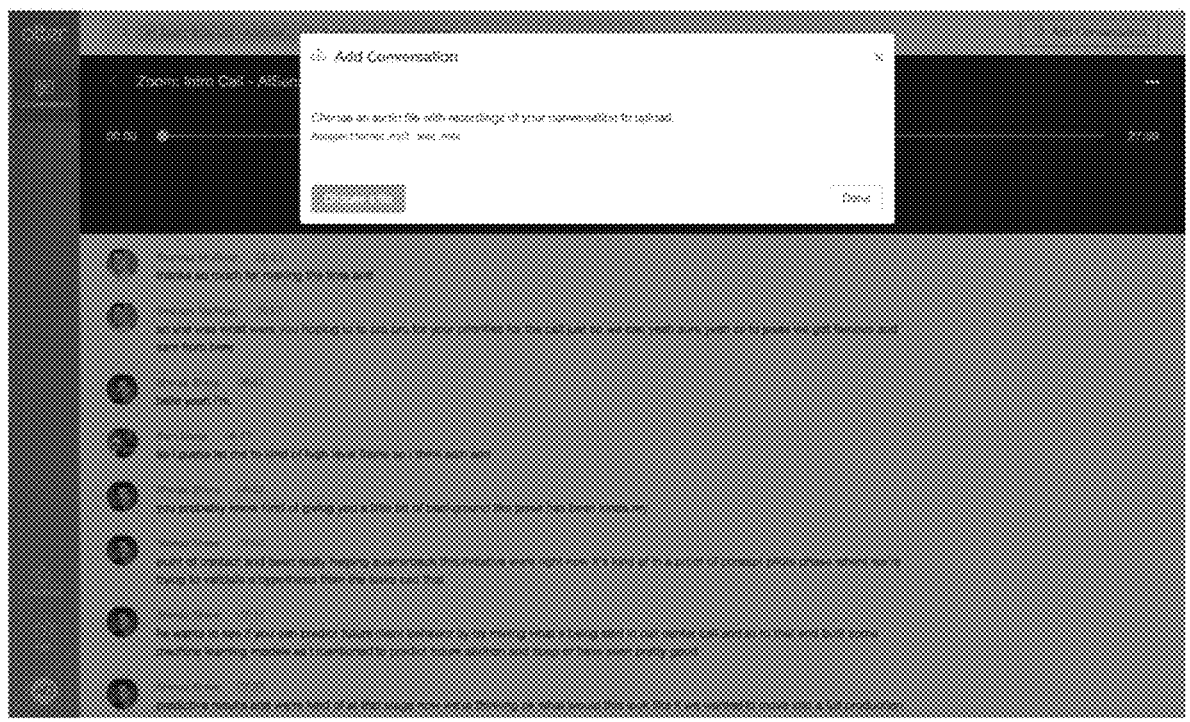
Figure 10:
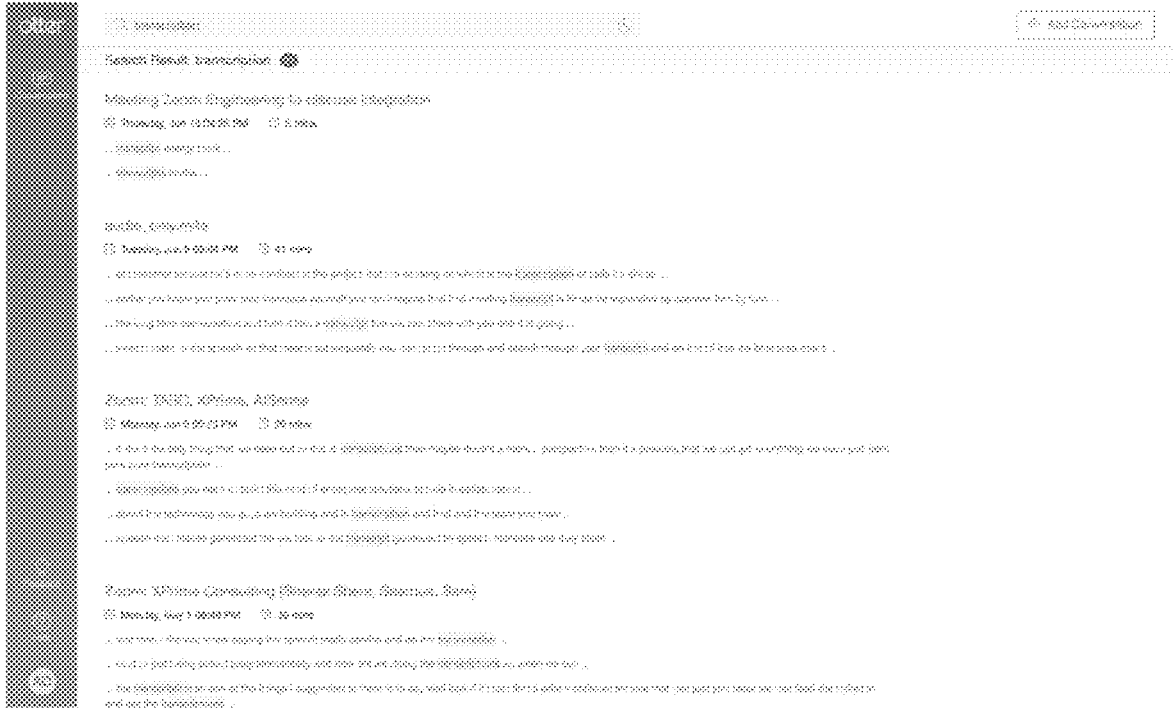

FIG. 9 shows an add conversation page according to certain embodiments. For example, the add conversation page indicates that the system (e.g., the system 100) accepts one or more audio files in .mp3, .wav, and/or .m4a. FIG. 10 shows a dashboard displaying a number of matching results in response to a keyword search via the search bar, according to some embodiments. In some examples, the dashboard as shown in FIG. 10 provides a search result count or quantity and also displays the matching results in the plurality of conversations (e.g., in their corresponding synchronized texts) in a highlighted form (e.g., highlighted in yellow). For example, the matching results are displayed with text before and/or after (e.g., to help provide context).

FIG. 11 shows a conversation page presenting a number of matching results in response to a keyword search via the search bar, according to certain embodiments. In some examples, the conversation page as shown in FIG. 11 provides a search result count or quantity and also displays the matching results in the presented transformed conversation (e.g., in its synchronized texts) in a highlighted form (e.g., highlighted in yellow). For example, each of the matching results is displayed with the conversation segment including the matching result. In certain examples, the conversation page as shown in FIG. 11 displays a summary section of the matching search results with truncated transcription for each conversation segment including one or more of the matching results.

In some examples, the conversation page as shown in FIG. 11 displays markings (e.g., highlighted markings) in a player (e.g., audio player) to indicate the timestamps of the matching results. For example, the matching result that is being played in audio form is highlighted in saturated yellow, whereas the rest of the matching results are highlighted in faded yellow, in the synchronized text and/or in the audio player (e.g., by the progress bar). In certain examples, the conversation page as shown in FIG. 11 displays one or more words and/or phrases in a second highlighted form such as in a green highlight, the one or more words and/or phrases matching to the audio content corresponding to the same timestamp.

Figure 12:
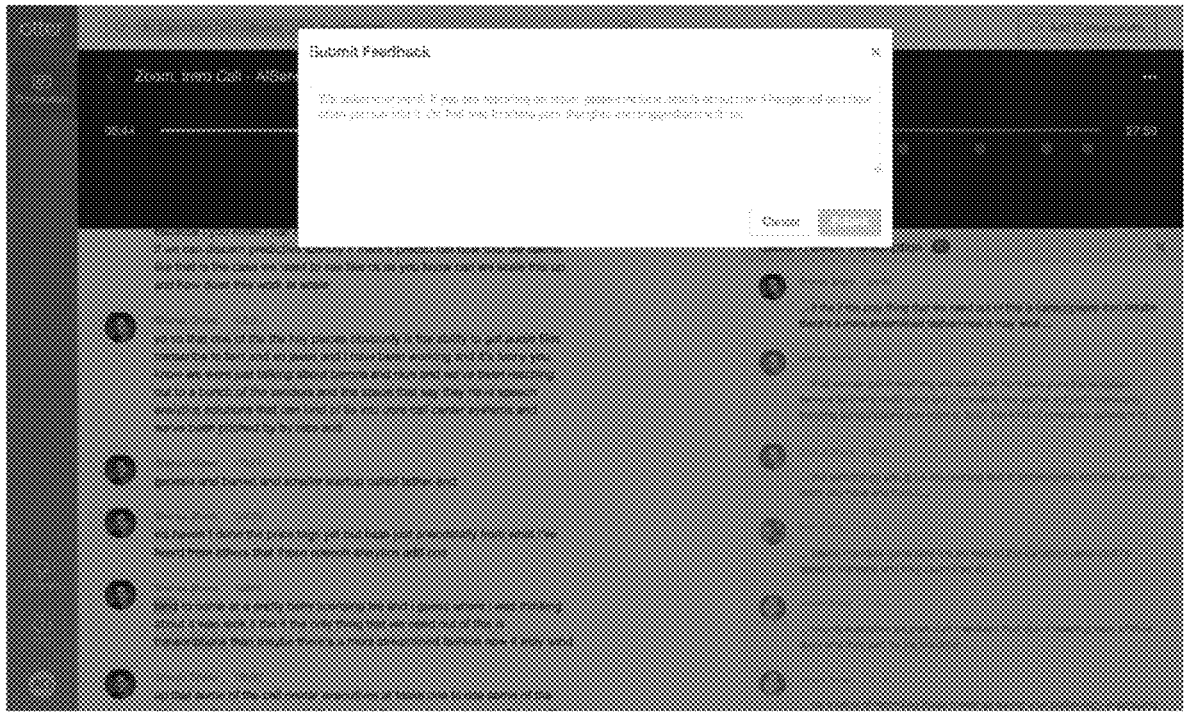
Figure 13:

FIG. 12 shows a submit feedback page according to some examples. FIG. 13 shows a frequently asked questions page according to certain examples. For example, FIG. 13 describes that the conversations captured and/or processed are configured to be sharable with others. FIG. 14 shows a conversation page displaying a number of matching results in response to a keyword search via the search bar, according to some embodiments. For example, the conversation page as shown in FIG. 14 displays vertically or in portrait mode and in some embodiments is adapted for mobile phones.

FIG. 15 shows a sign up page according to certain embodiments. FIG. 16 shows a create an account page according to some embodiments. FIG. 17 shows a login page according to certain embodiments. For example, one or more of the user interfaces of FIGS. 15-17 display vertically or in portrait mode and in some embodiments are adapted for mobile phones.

FIG. 18 shows an upload and transcribe page according to some embodiments. For example, the upload and transcribe page as shown in FIG. 18 indicates that, in some embodiments, the systems and/or methods is configured to record a call (e.g., a phone call) and/or transcribe a call recording (e.g., an uploaded call recording).

FIG. 19 shows a call selection page according to certain embodiments. In some examples, the call selection page as shown in FIG. 19 displays a plurality of call recordings (e.g., stored in a mobile phone) configured to be selected to be uploaded and/or transcribed, and/or shared (e.g., emailed) with others. In certain examples, the call selection page as shown in FIG. 19 displays metadata of each call recording, including number of the caller and/or receiver, incoming and/or outgoing call indicator, name of the caller and/or receiver, size of the call recording, the time and date of recording, and/or the duration of the call recording. FIG. 20 shows a notification configured to be sent (e.g., to a user or recipient) when a transcript (i.e., transcription) is available (e.g., when partly, substantially, or fully processed or transcribed) for viewing, according to some embodiments.

Figure 21:
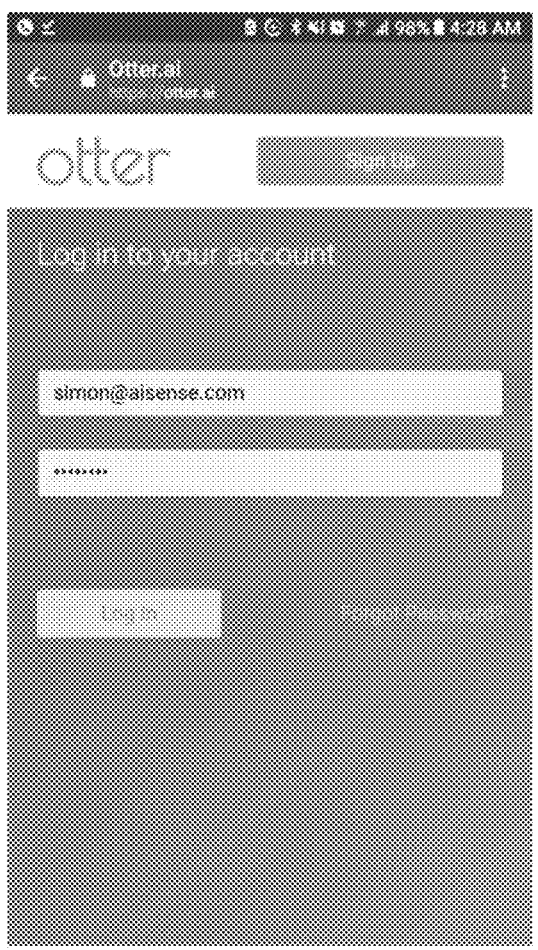

FIG. 21 shows a login page according to certain embodiments. In some examples, the login page as shown in FIG.

21 includes a web address. FIG. 22 shows a conversation page for a phone call according to some embodiments. In some examples, the conversation page as shown in FIG. 22 displays conversation segments each assigned with a speaker label (e.g., a speaker label of unknown identity, including no name and a placeholder picture). In certain examples, such unknown identity is assigned when speaker of a conversation segment is unknown to the system.

According to another embodiment, a system for processing and presenting a conversation includes a sensor configured to capture an audio-form conversation, and a processor configured to automatically transform the audio-form conversation into a transformed conversation. The transformed conversation includes a synchronized text, and the synchronized text is synchronized with the audio-form conversation. Additionally, the system includes a presenter configured to present the transformed conversation including the synchronized text and the audio-form conversation. For example, the system is implemented according to at least FIG. 1, FIG. 2, and/or FIG. 3.

In some examples, the audio-form conversation includes a human-to-human conversation in audio form. In certain examples, the human-to-human conversation includes a meeting conversation. In some examples, the human-to-human conversation includes a phone conversation. In certain examples, the system further includes a controller configured to switch the sensor between a capturing state and an idling state. In some examples, the system further includes an interface configured to receive a user instruction to instruct the controller to switch the sensor between the capturing state and the idling state. In certain examples, the presenter is further configured to function as the interface.

In certain examples, the processor is further configured to automatically segment the audio-form conversation and the synchronized text and generate the segmented audio-form conversation and the segmented synchronized text. In some examples, the presenter is further configured to present the transformed conversation, the transformed conversation including the one or more segments of the audio-form conversation and the one or more segments of the synchronized text. In certain examples, each segment of the one or more segments of the audio-form conversation is spoken by only one speaker in audio form and is synchronized with only one segment of the one or more segments of the synchronized text. In some examples, the speaker corresponds to a speaker label. In certain examples, the speaker label includes a speaker name of the speaker. In some examples, wherein the speaker label includes a speaker picture of the speaker.

In certain examples, the processor is further configured to automatically assign only one speaker label to the segment of the one or more segments of the synchronized text, the speaker label representing the speaker. In some examples, the processor is further configured to automatically generate the speaker-assigned segmented synchronized text and the corresponding segmented audio-form conversation. In certain examples, the presenter is further configured to present the transformed conversation, the transformed conversation including the speaker-assigned segmented synchronized text and the corresponding segmented audio-form conversation.

In some examples, the processor is further configured to receive metadata including a date for recording the audio-form conversation, a time for recording the audio-form conversation, a duration for recording the audio-form conversation, and a title for the audio-form conversation, and the presenter is further configured to present the metadata. In certain examples, the presenter is further configured to present the transformed conversation both navigable and searchable. In some examples, the presenter is further configured to present one or more matches of a searched text in a first highlighted state, the one or more matches being one or more parts of the synchronized text. In certain examples, the presenter is further configured to highlight the audio-form conversation at one or more timestamps, the one or more timestamps corresponding to the one or more matches of the searched text respectively. In some examples, the presenter is further configured to present a playback text in a second highlighted state, the playback text being at least a part of the synchronized text and corresponding to at least a word recited during playback of the audio-form conversation.

According to yet another embodiment, a computer-implemented method for processing and presenting a conversation includes receiving an audio-form conversation, and automatically transforming the audio-form conversation into a transformed conversation. The transformed conversation includes a synchronized text, and the synchronized text is synchronized with the audio-form conversation. Additionally, the method includes presenting the transformed conversation including the synchronized text and the audio-form conversation. For example, the computer-implemented method is implemented according to at least FIG. 1, FIG. 2, and/or FIG. 3.

In some examples, the automatically transforming the audio-form conversation into a transformed conversation includes automatically segmenting the audio-form conversation and the synchronized text and generating the segmented audio-form conversation and the segmented synchronized text. The segmented audio-form conversation includes one or more segments of the audio-form conversation, and the segmented synchronized text includes one or more segments of the synchronized text. In certain examples, wherein the presenting the transformed conversation including the synchronized text and the audio-form conversation includes: presenting the transformed conversation including the one or more segments of the audio-form conversation and the one or more segments of the synchronized text. In some examples, each segment of the one or more segments of the audio-form conversation is spoken by only one speaker in audio form and is synchronized with only one segment of the one or more segments of the synchronized text, and the speaker corresponds to only one speaker label.

In certain examples, the automatically transforming the audio-form conversation into a transformed conversation further includes automatically assigning the speaker label to the segment of the one or more segments of the synchronized text, and the segment of the one or more segments of the synchronized text is not assigned to any other speaker label. In some examples, the automatically transforming the audio-form conversation into a transformed conversation further includes automatically generating the speaker-assigned segmented synchronized text and the corresponding segmented audio-form conversation. In certain examples, the presenting the transformed conversation including the synchronized text and the audio-form conversation includes: presenting the transformed conversation including the speaker-assigned segmented synchronized text and the corresponding segmented audio-form conversation.

In some examples, the method further includes receiving metadata including a date for recording the audio-form conversation, a time for recording the audio-form conversation, a duration for recording the audio-form conversation, and a title for the audio-form conversation, and the presenting the transformed conversation including the synchronized text and the audio-form conversation includes presenting the metadata.

In certain examples, the presenting the transformed conversation including the synchronized text and the audio-form conversation includes presenting the transformed conversation both navigable and searchable. In some examples, the presenting the transformed conversation both navigable and searchable includes presenting one or more matches of a searched text in a first highlighted state, the one or more matches being one or more parts of the synchronized text. In certain examples, the presenting the transformed conversation both navigable and searchable further includes highlighting the audio-form conversation at one or more timestamps, the one or more timestamps corresponding to the one or more matches of the searched text respectively. In some examples, the presenting the transformed conversation both navigable and searchable further includes presenting a playback text in a second highlighted state, the playback text being at least a part of the synchronized text and corresponding to at least a word recited during playback of the audio-form conversation.

In certain examples, the receiving an audio-form conversation includes receiving the audio-form conversation being recorded in real-time. In some examples, the receiving an audio-form conversation includes receiving an audio-form conversation having been pre-recorded. In certain examples, the receiving an audio-form conversation having been pre-recorded includes receiving a file for the pre-recorded audio-form conversation.

According to yet another embodiment, a non-transitory computer-readable medium with instructions stored thereon, that when executed by a processor, perform the processes including: receiving an audio-form conversation: automatically transforming the audio-form conversation into a transformed conversation, the transformed conversation including a synchronized text, the synchronized text being synchronized with the audio-form conversation; and presenting the transformed conversation including the synchronized text and the audio-form conversation. For example, the non-transitory computer-readable medium is implemented according to at least FIG. 1, FIG. 2, and/or FIG. 3.

In some examples, the automatically transforming the audio-form conversation into a transformed conversation includes automatically segmenting the audio-form conversation and the synchronized text and generating the segmented audio-form conversation and the segmented synchronized text. The segmented audio-form conversation includes one or more segments of the audio-form conversation, and the segmented synchronized text includes one or more segments of the synchronized text. In certain examples, the presenting the transformed conversation including the synchronized text and the audio-form conversation includes: presenting the transformed conversation including the one or more segments of the audio-form conversation and the one or more segments of the synchronized text.

In some examples, each segment of the one or more segments of the audio-form conversation is spoken by only one speaker in audio form and is synchronized with only one segment of the one or more segments of the synchronized text, and the speaker corresponds to only one speaker label. In certain examples, the automatically transforming the audio-form conversation into a transformed conversation further includes automatically assigning the speaker label to the segment of the one or more segments of the synchronized text, and the segment of the one or more segments of the synchronized text is not assigned to any other speaker label. In some examples, the automatically transforming the audio-form conversation into a transformed conversation further includes automatically generating the speaker-assigned segmented synchronized text and the corresponding segmented audio-form conversation. In certain examples, the presenting the transformed conversation including the synchronized text and the audio-form conversation includes: presenting the transformed conversation including the speaker-assigned segmented synchronized text and the corresponding segmented audio-form conversation.

In some examples, the non-transitory computer-readable medium with the instructions stored thereon, that when executed by the processor, perform the processes further including: receiving metadata including a date for recording the audio-form conversation, a time for recording the audio-form conversation, a duration for recording the audio-form conversation, and a title for the audio-form conversation. The presenting the transformed conversation including the synchronized text and the audio-form conversation includes presenting the metadata.

In certain examples, the presenting the transformed conversation including the synchronized text and the audio-form conversation includes presenting the transformed conversation both navigable and searchable. In some examples, the presenting the transformed conversation both navigable and searchable includes presenting one or more matches of a searched text in a first highlighted state. The one or more matches are one or more parts of the synchronized text. In certain examples, the presenting the transformed conversation both navigable and searchable further includes highlighting the audio-form conversation at one or more timestamps, the one or more timestamps corresponding to the one or more matches of the searched text respectively. In some examples, the presenting the transformed conversation both navigable and searchable further includes presenting a playback text in a second highlighted state, the playback text being at least a part of the synchronized text and corresponding to at least a word recited during playback of the audio-form conversation.

In certain examples, the receiving an audio-form conversation includes receiving the audio-form conversation being recorded in real-time. In some examples, the receiving an audio-form conversation includes receiving an audio-form conversation having been pre-recorded. In certain examples, the receiving an audio-form conversation having been pre-recorded includes receiving a file for the pre-recorded audio-form conversation.

According to yet another embodiment, a system for presenting a conversation includes: a sensor configured to capture an audio-form conversation and send the captured audio-form conversation to a processor, the processor configured to automatically transform the audio-form conversation into a transformed conversation, the transformed conversation including a synchronized text, the synchronized text being synchronized with the audio-form conversation, and a presenter configured to receive the transformed conversation from the processor and present the transformed conversation including the synchronized text and the audio-form conversation. For example, the system is implemented according to at least FIG. 1, FIG. 2, and/or FIG. 3.

According to yet another embodiment, a computer-implemented method for processing and presenting a conversation includes: receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation. For example, the method is implemented according to at least FIG. 1, FIG. 2, and/or FIG. 3.

According to yet another embodiment, a non-transitory computer-readable medium with instructions stored thereon, that when executed by a processor, perform the processes including: receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation. For example, the non-transitory computer-readable medium is implemented according to at least FIG. 1, FIG. 2, and/or FIG. 3.

According to yet another embodiment, a system for transforming a conversation includes a processor configured to: receive from a sensor a captured audio-form conversation; automatically transform the audio-form conversation into a transformed conversation, the transformed conversation including a synchronized text, the synchronized text being synchronized with the audio-form conversation; and send the transformed conversation to a presenter configured to present the transformed conversation including the synchronized text and the audio-form conversation. For example, the system is implemented according to at least FIG. 1, FIG. 2, and/or FIG. 3.

According to yet another embodiment, a computer-implemented method for transforming a conversation includes: receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation. For example, the method is implemented according to at least FIG. 1, FIG. 2, and/or FIG. 3.

According to yet another embodiment, a non-transitory computer-readable medium with instructions stored thereon, that when executed by a processor, perform the processes comprising: receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation. For example, the non-transitory computer-readable medium is implemented according to at least FIG. 1, FIG. 2, and/or FIG. 3.

Various embodiments are related to architecture, flow, and presentation of conversations. For example, certain embodiments include systems, methods, and apparatuses for architecture, flow and presentation of conversations. For at least one embodiment, the conversations include human to human conversations. At least some embodiments include transcribing conversations. At least some embodiments provide searching within the conversations. At least some embodiments include automatic word synchronization which includes synchronization of the audio with the transcript. At least some embodiments include speaker identification. For at least some embodiments, the speaker identification includes a label. For at least some embodiments, the label includes a picture of the speaker.

Some embodiments of the present invention improve speech recognition, diarization and/or speaker-identification (e.g., based on machine learning and/or artificial intelligence). Some examples of the present invention collect a large quantity of speech data and select proper training data which match the end-user speech environment to achieve high speech recognition accuracy, by for example, making speech recognition more resilient to background noise, to far-field speech with lower signal-noise ratio, and/or to various speech accents. Certain examples of the present invention can process a conversation quickly. Some examples of the present invention can separate speeches that are spoken by multiple human speakers. Certain examples of the present invention can process one or more long-form conversation (e.g., a long-form conversation that lasts for several hours) accurately and reliably.

Certain embodiments of the present invention provide excellent user experience and help a broad range of users to improve their daily lives and/or daily work. Some examples of the present invention allow users to avoid taking notes manually (e.g., avoid writing on a paper notebook and/or avoid typing on a computer) so that the users can engage better with other speakers in the conversations and also improve effectiveness of their meetings. Certain examples of the present invention can generate notes for conversations in real time, dramatically reducing turn-around time than by using human transcribers. Some examples of the present invention can dramatically improve enterprise productivity. Certain examples of the present invention can function for in-person meetings, phone calls, and/or video conferences. Some examples of the present invention can automatically generate notes that are digital and searchable. Certain examples of the present invention can automatically generate notes that can be easily shared with colleagues, thus improving collaboration. Some examples of the present invention can help students take lecture notes. Certain examples of the present invention can help deaf students to learn, thus improving their educational experience.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for processing and presenting a conversation, the system comprising:
    a sensor configured to, upon receipt of a user instruction, capture a live audio-form conversation;
    a processor configured to, upon receiving the live audio-form conversation when the live audio-form conversation is being captured:
        automatically transcribe, in real time or in near-real time with the live audio-form conversation, the live audio-form conversation into a live synchronized text, the live synchronized text being synchronized with the live audio-form conversation;
        automatically generate, in real time or in near-real time with the live audio-form conversation, one or more segments of the live audio-form conversation and one or more segments of the live synchronized text by at least:
            identifying when a speaker change occurs during the live audio-form conversation;
            in response to the identifying when a speaker change occurs during the live audio-form conversation, automatically segmenting the live audio-form conversation and the live synchronized text such that each segment of the one or more segments of the live audio-form conversation is spoken by only one speaker;
            identifying when a natural pause occurs during the live audio-form conversation;
            in response to the identifying when a natural pause occurs during the live audio-form conversation, automatically segmenting the live audio-form conversation and the live synchronized text such that each segment of the one or more segments of the live audio-form conversation is synchronized with only one segment of the one or more segments of the live synchronized text; and
        automatically assign, in real time or in near-real time with the live audio-form conversation, only one speaker label to each segment of the one or more segments of the live synchronized text, each one speaker label representing one speaker; and
    a presenter configured to present, in real time or in near-real time with the live audio-form conversation, the labeled live synchronized text and the live audio-form conversation;
    wherein in near-real time is a time delay less than one minute.

2. The system of claim 1, wherein the live audio-form conversation includes a human-to-human conversation in audio form.

3. The system of claim 1, wherein the live human-to-human conversation includes a meeting conversation.

4. The system of claim 1, wherein the live human-to-human conversation includes a phone conversation.

5. The system of claim 1, wherein the presenter is further configured to automatically present, in real time or near-real time with the live audio-form conversation, the speaker-assigned segmented live synchronized text and the corresponding segmented live audio-form conversation.

6. The system of claim 1, wherein the presenter is further configured to present the labeled live synchronized text to be both navigable and searchable.

7. The system of claim 6, wherein the presenter is further configured to present one or more matches of a searched text in a first highlighted state, the one or more matches being one or more parts of the synchronized text.

8. The system of claim 7, wherein the presenter is further configured to highlight the live audio-form conversation at one or more timestamps, the one or more timestamps corresponding to the one or more matches of the searched text respectively.

9. A computer-implemented method for processing and presenting a conversation, the method comprising:
- capturing, via a sensor, a live audio-form conversation; and
- upon receiving the live audio-form conversation when the live audio-form conversation is being captured:
  - automatically transcribing, in real time or in near-real time with the live audio-form conversation, the live audio-form conversation into a live synchronized text, the live synchronized text being synchronized with the live audio-form conversation;
  - automatically generating, in real time or in near-real time with the live audio-form conversation, one or more segments of the live audio-form conversation and one or more segments of the live synchronized text by at least:
    - identifying when a speaker change occurs during the live audio-form conversation;
    - in response to the identifying when a speaker change occurs during the live audio-form conversation, automatically segmenting the live audio-form conversation and the live synchronized text such that each segment of the one or more segments of the live audio-form conversation is spoken by only one speaker;
    - identifying when a natural pause occurs during the live audio-form conversation;
    - in response to the identifying when a natural pause occurs during the live audio-form conversation, automatically segmenting the live audio-form conversation and the live synchronized text such that each segment of the one or more segments of the live audio-form conversation is synchronized with only one segment of the one or more segments of the live synchronized text;
  - automatically assigning, in real time or in near-real time with the live audio-form conversation, only one speaker label to each segment of the one or more segments of the live synchronized text, each one speaker label representing one speaker; and
  - presenting, in real time or in near-real time with the live audio-form conversation, the labeled live synchronized text and the live audio-form conversation;
- wherein in near-real time is a time delay less than one minute.

10. The computer-implemented method of claim 9, wherein the live audio-form conversation includes a human-to-human conversation in audio form.

11. The computer-implemented method of claim 9, wherein the live human-to-human conversation includes a meeting conversation.

12. The computer-implemented method of claim 9, wherein the presenting the labeled live synchronized text and the live audio-form conversation includes presenting, in real time or near-real time with the live audio-form conversation, the speaker-assigned segmented live synchronized text and the corresponding segmented live audio-form conversation.

13. The computer-implemented method of claim 9, wherein the presenting the labeled live synchronized text and the live audio-form conversation includes presenting the labeled live synchronized text to be both navigable and searchable.

14. The computer-implemented method of claim 9, wherein the presenting the labeled live synchronized text and the live audio-form conversation includes presenting one or more matches of a searched text in a first highlighted state, the one or more matches being one or more parts of the synchronized text.

15. The computer-implemented method of claim 14, wherein the presenting the labeled live synchronized text and the live audio-form conversation includes highlighting the live audio-form conversation at one or more timestamps, the one or more timestamps corresponding to the one or more matches of the searched text respectively.

16. A non-transitory computer-readable medium with instructions stored thereon, that when executed by a processor, perform the processes comprising:
- capturing, via a sensor, a live audio-form conversation; and
- upon receiving the live audio-form conversation when the live audio-form conversation is being captured:
  - automatically transcribing, in real time or in near-real time with the live audio-form conversation, the live audio-form conversation into a live synchronized text, the live synchronized text being synchronized with the live audio-form conversation;
  - automatically generating, in real time or in near-real time with the live audio-form conversation, one or more segments of the live audio-form conversation and one or more segments of the live synchronized text by at least:
    - identifying when a speaker change occurs during the live audio-form conversation;
    - in response to the identifying when a speaker change occurs during the live audio-form conversation, automatically segmenting the live audio-form conversation and the live synchronized text such that each segment of the one or more segments of the live audio-form conversation is spoken by only one speaker;
    - identifying when a natural pause occurs during the live audio-form conversation;
    - in response to the identifying when a natural pause occurs during the live audio-form conversation, automatically segmenting the live audio-form conversation and the live synchronized text such that each segment of the one or more segments of the live audio-form conversation is synchronized with only one segment of the one or more segments of the live synchronized text;
  - automatically assigning, in real time or in near-real time with the live audio-form conversation, only one speaker label to each segment of the one or more segments of the live synchronized text, each one speaker label representing one speaker; and
  - presenting, in real time or in near-real time with the live audio-form conversation, the labeled live synchronized text and the live audio-form conversation;
- wherein in near-real time is a time delay less than one minute.

17. The non-transitory computer-readable medium of claim 16, wherein the presenting the labeled live synchronized text and the live audio-form conversation includes presenting, in real time or near-real time with the live audio-form conversation, the speaker-assigned segmented live synchronized text and the corresponding segmented live audio-form conversation.

18. The non-transitory computer-readable medium of claim 16, wherein the presenting the labeled live synchronized text and the live audio-form conversation includes presenting the labeled live synchronized text to be both navigable and searchable.

19. The non-transitory computer-readable medium of claim 18, wherein the presenting the labeled live synchronized text and the live audio-form conversation includes presenting one or more matches of a searched text in a first highlighted state, the one or more matches being one or more parts of the synchronized text.

20. The non-transitory computer-readable medium of claim 19, wherein the presenting the labeled live synchronized text and the live audio-form conversation includes highlighting the live audio-form conversation at one or more timestamps, the one or more timestamps corresponding to the one or more matches of the searched text respectively.

* * * * *